(12) United States Patent
Downing

(10) Patent No.: US 6,341,367 B1
(45) Date of Patent: Jan. 22, 2002

(54) HARDWARE REALIZED STATE MACHINE

(75) Inventor: Kevin A. Downing, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/624,932

(22) Filed: Jul. 25, 2000

(51) Int. Cl.$^7$ ............................................. H03K 17/693
(52) U.S. Cl. ............................... 716/16; 716/1; 326/46; 709/102; 709/107; 711/103
(58) Field of Search .......................... 326/46; 709/102, 709/107; 711/103; 703/13; 340/870.19; 716/1, 16

(56) References Cited

U.S. PATENT DOCUMENTS

| | | | |
|---|---|---|---|
| 5,227,783 A | * 7/1993 | Shaw et al. | ............ 340/870.19 |
| 5,463,757 A | * 10/1995 | Fandrich et al. | ............ 711/103 |
| 5,477,168 A | * 12/1995 | Thijssen et al. | ............... 326/46 |
| 5,594,656 A | * 1/1997 | Tamisier | ...................... 703/13 |
| 6,154,763 A | * 11/2000 | Thijssen | ...................... 709/102 |

* cited by examiner

Primary Examiner—Matthew Smith
Assistant Examiner—Jibreel Speight
(74) Attorney, Agent, or Firm—Suiter & Associates

(57) ABSTRACT

A state machine is disclosed that is capable of providing improved performance as realized in a hardware embodiment while providing the flexibility of a software implemented state machine. The state machine is first implemented in software, and then is realized in a hardware embodiment based upon the software implemented state machine. Flexibility is added to the hardware realized state machine by providing registers for the hardware embodiment so that the register corresponds to states of the software implementation. As a result, at least one aspect of the hardware realized state machine may be modified without requiring redesigning the configuration of the hardware embodiment. The performance of the state machine is improved by providing a separate state machine for receiving incoming data packets so that a main state machine is capable of operating without interruption by the incoming data packets and is capable of receiving the incoming data packets from the separate, incoming data packet receiving state machine only when the main state machine is ready to receive the incoming information. It is emphasized that this abstract is provided to comply with the rules requiring an abstract that will allow a searcher or other researcher to quickly ascertain the subject matter of the technical disclosure. It is submitted with the understanding that it will not be used to interpret or limit the scope or meaning of the claims.

14 Claims, 6 Drawing Sheets

HARDWARE REALIZED STATE MACHINE

BACKGROUND

Control functions such as state machines are typically implemented in software that controls a general-purpose microprocessor. One typical advantage of implementing control functions in software is that doing so provides flexibility to modify or alter the control functions since a programmer is able to modify and recompile the source code to implement the changes. However, software implemented state machines are typically slower than state machines that are realized directly in hardware using logic gates. A disadvantage of hardware realized state machines is that once a design has been implemented, changing the control functions of the state machine requires redesigning the hardware circuit thereby making any changes difficult or impractical. Furthermore, the performance of a state machine is reduced when it must wait for and process incoming packets of data. This slows down the performance of the state machine since the state machine must wait for a complete packet to be sent. Thus, there lies a need for a state machine design that provides improved flexibility and performance.

SUMMARY

The present invention is directed to a state machine realized in hardware that provides the flexibility of a software realized state machine while providing the performance advantage of a hardware circuit. The flexibility of the hardware realized state machine is achieved by providing the state machine with programmable registers to allow changes in the state machine to be implemented. The present invention is further directed to a state machine design in which a first state machine receives and processes incoming data packets and only provides the received packets to a second state machine when an incoming data packet has been received in its entirety, thereby freeing the second state machine to provide a higher level of performance.

A state machine is capable of providing improved performance as realized in a hardware embodiment while providing the flexibility of a software implemented state machine. The state machine is first implemented in software, and then is realized in a hardware embodiment based upon the software implemented state machine. Flexibility is added to the hardware realized state machine by providing registers for the hardware embodiment so that the register corresponds to states of the software implementation. As a result, at least one aspect of the hardware realized state machine may be modified without requiring redesigning the configuration of the hardware embodiment. The performance of the state machine is improved by providing a separate state machine for receiving incoming data packets so that a main state machine is capable of operating without interruption by the incoming data packets and is capable of receiving the incoming data packets from the separate, incoming data packet receiving state machine only when the main state machine is ready to receive the incoming information.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1A:
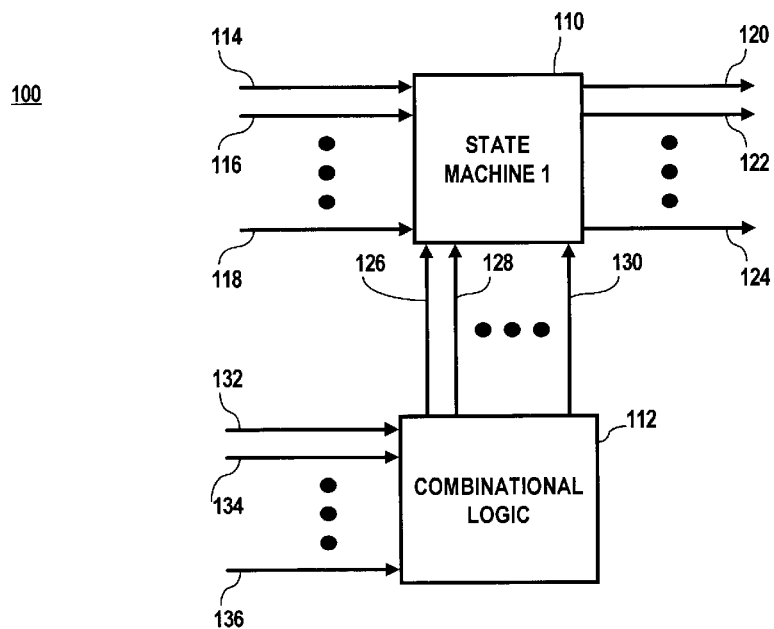
FIGS. 1A and 1B are block diagrams of a system comprising a first state machine and a second state machine for controlling the first state machine in accordance with the present invention.
Figure 1B:
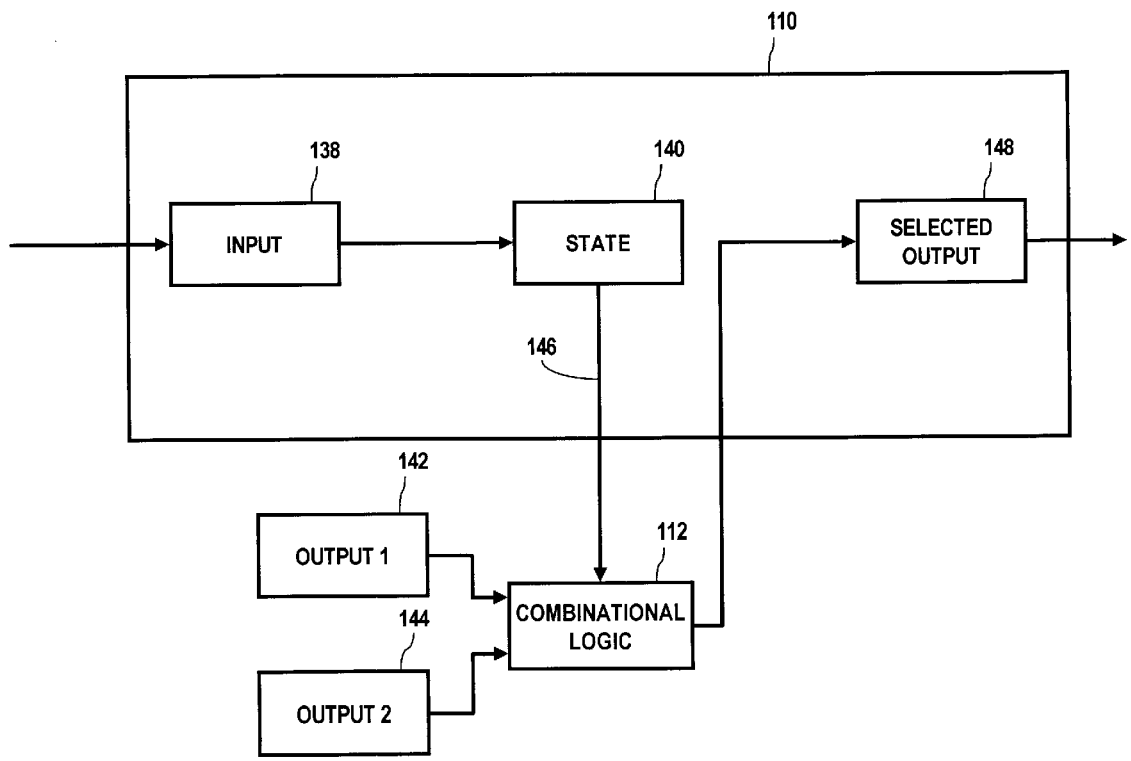

Referring now to FIGS. 1A and 1B, a diagram of a system comprising a state machine having at least one or more reusable states and controlled by combinational logic in accordance with the present invention will be discussed. The system 100 comprises a state machine 110 having at least one or more inputs 114, 116, and up to an Nth input 118. State machine 110 is capable of providing at least one or more outputs 120, 122, up to an Mth output 124 in response to at least one or more of inputs 114, 116, and 118. System 100 further comprises combinational logic 112 having at least one or more inputs 132, 134, up to an Ith input 136. Combinational logic 112 is capable of providing at least one or more outputs 126, 128, up to a Jth output 130 in response to at least one or more of inputs 132, 134, and 136.

As shown in FIG. 1B, a state 140 of state machine 110 receives input 138. State machine 112 includes at least two states 146 and 148 and is in either one of states 146 and 148. When state machine 140 receives input 138, one of two outputs, 142 and 144, may be selected by state 140 via selection line 146 depending upon the desired output to be selected in response to input 138. Combinational logic 112 selects either output 142 or 144 based upon the signal received at selection line 146 and provides selected output 148 as the desired response to input 148. Without such a configuration using combinational logic 112, state machine would have required a first path from state 140 including a first additional state to implement first output 142, and would have required a second path from state 140 including a second additional state to implement second output 144. However, using the configuration as shown in FIG. 1B, and in general in FIG. 1A, the complexity of state machine 110 is reduced such that any additional states are eliminated and state 140 is used under a first condition to provide output 142, and then used again, i.e., "reused", under a second condition to provide output 144. Eliminating such additional states and implementing combinational logic 112 results in a net gate savings and a lesser complexity for state machine 110. In one embodiment of the present invention, combinational logic 112 includes a multiplexer for selecting either of output 142 or 144 in response to a selection signal 146. In the example shown in FIG. 1B, combinational logic 112 would include a 2-to-1 multiplexer. Depending on the number of desired outputs to be selected, and depending on the number of selected outputs desired, combinational logic 112 any combination of one or more multiplexers and one or more demultiplexers may be utilized without providing substantial change to the present invention. Furthermore, one or more multiplexers and one or more demultiplexers may receive select signals from one or more states of state machine 110 as desired to implement the outputs to be selected and the resulting selected outputs. One having skill in the art would recognize that, depending on the functions to be implemented by combinational logic 112, and depending upon the transistor technology utilized (e.g., transistor-transistor logic (TTL), metal-oxide field-effect transistors (MOSFET). etc.) that the circuits of combinational logic 112 need not be limited to multiplexers or demultiplexers, and that any proper combinational logic units may be utilized without providing substantial change to the scope of the present invention.

Figure 2:
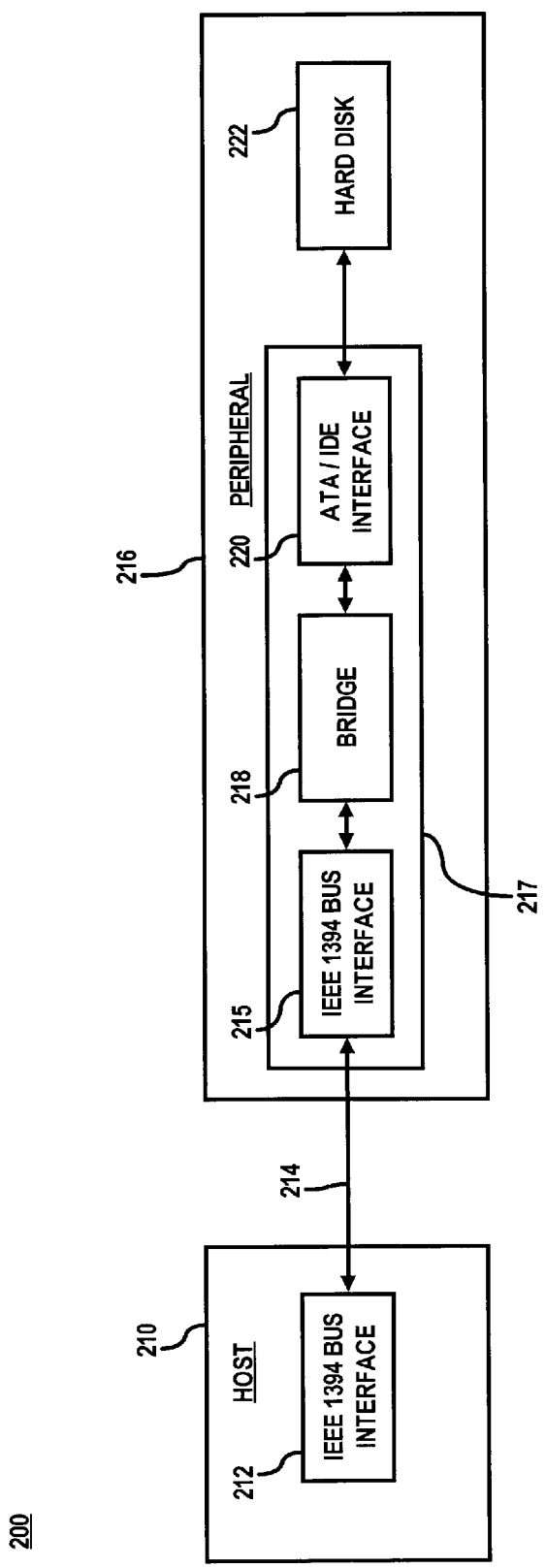
FIG. 2 is a block diagram of a computer host and peripheral system operable to tangibly embody the present invention.

Referring now to FIG. 2, a block diagram of a system in which the present invention may be utilized will be discussed. Host and peripheral system 200 includes a host 210 for controlling a peripheral device 216. Host 210 may include a first interface, such as an IEEE 1394 bus interface 212, whereas peripheral device 216 may include a second interface, such as an ATA/IDE interface, 220, for example for controlling a hard disk 222. In order for host 210 having first interface 212 to communicate with and utilize peripheral device 216 having second interface 220 via communications link 214, a bridge 218 between the first interface and second interface is utilized. In the example shown, a bus interface 215 is provided in peripheral 216 so that peripheral 216 may communicate with host 210 in accordance with the first interface standard. Bridge 218 couples between bus interface 215 and ATA/IDE interface 220 so that commands received from host 210 using the first interface standard are converted to the second interface standard which is interpretable by hard disk 222. Bus interface 215, bridge 218, and ATA/IDE interface may be provided on a single chip 217 disposed within peripheral 216. State machine 110 and combinational logic 112 of FIGS. 1A and 1B are utilized in accordance with the present invention for implementing bridge 218 such that a command provided by host 210 may be interpreted and executed by peripheral 216. One having skill in the art would recognize that applications other than bridge 218 of host and peripheral system 200 may be likewise suitable for the application of the present invention without providing substantial change thereto.

Figure 3:
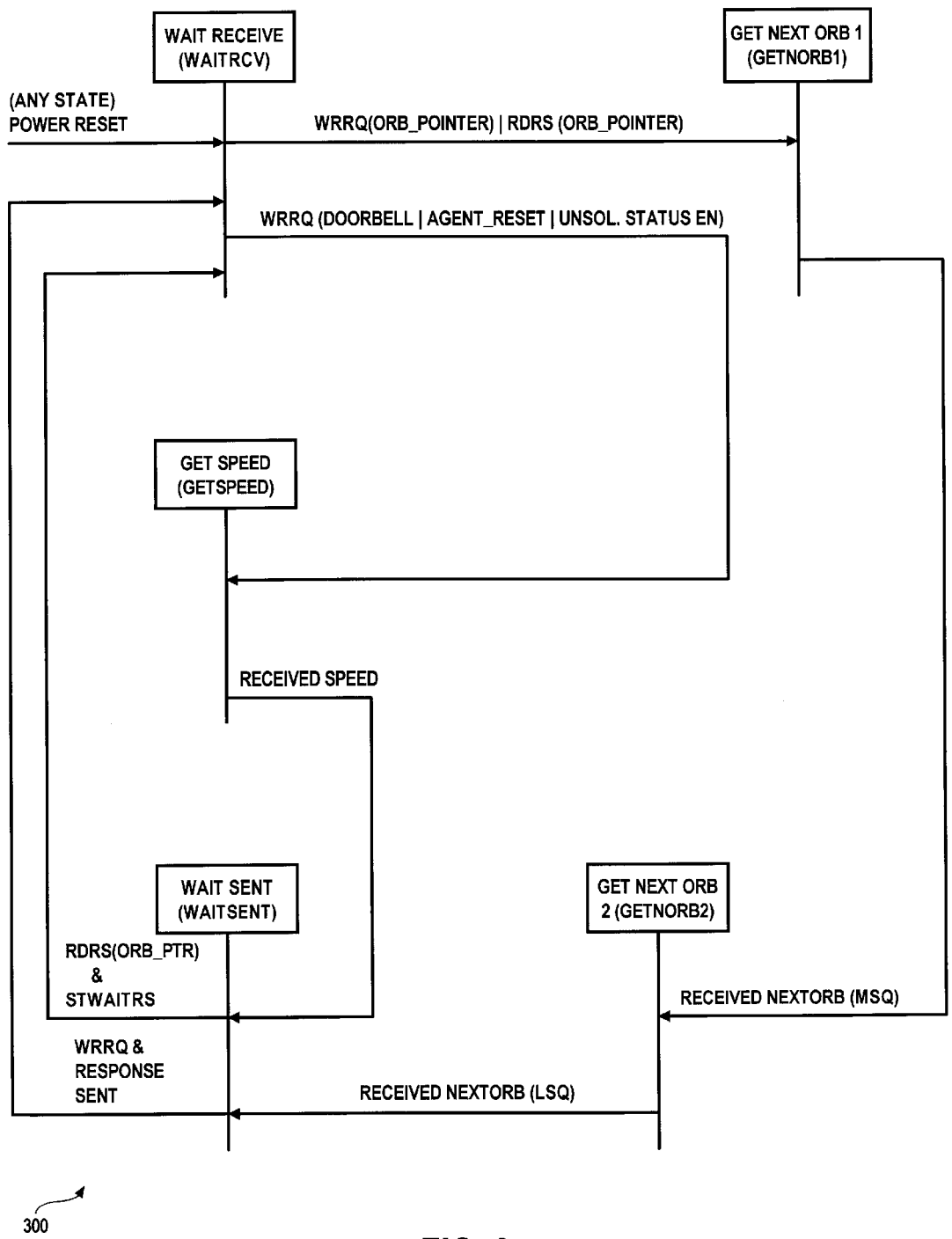
FIG. 3 is a block diagram of a state machine configuration that provides the capability of allowing incoming data packets to be processed regardless of the current state of the state machine.

Referring now to FIG. 3, a block diagram of a state machine configuration that provides the capability of allowing incoming data packets to be processed regardless of the current state of the state machine in accordance with the present invention. State machine 300 as shown in FIG. 3 is entitled "RECEIVE" state machine. The Receive state machine 200 interfaces incoming packets with the Fetch Agent state machine 500 shown in FIG. 5. Receive state machine 300 independently accepts the received data packets. Once the Receive state machine 300 gets into the WAITSENT state, at which point the incoming data packet has been completely received, Receive state machine 300 will either send a response or wait for the Fetch Agent state machine 500 to be in the WAITRS state. In one particular embodiment of the present invention, there are five different packets that the Receive state machine 300 is capable of receiving. The data packets and corresponding actions are as follows, as described with respect to Receive state machine 300. The Write Request (ORB_POINTER) sends either a Write Response (COMPLETE) and update the ORB-POINTER register if the Fetch Agent state machine 200 is in the RESET or SUSPEND state. Otherwise, a Write Response (CONFLICT_ERROR) is sent in the event the Fetch Agent state machine 450 is in another state. Read Response (ORB_POINTER) updates the NextOrbPointer register and wait until the Fetch Agent state machine 500 is in the WAITRS state. Write Request (Doorbell) updates the Doorbell register and send a Write Response (COMPLETE). Write Request (AGENT_RESET) sends a Write Response (COMPLETE) and resets the Fetch Agent state machine 500. Write Request (Unsolicited Status Enable) sends a Write Response (COMPLETE) and sets the UStatEn register. Configuring Receive state machine 300 with respect to Fetch Agent state machine 500 as discussed allows the Receive state machine 300 to accept packets and to involve the Fetch Agent state machine 500 only when it is necessary. As a result, a performance increase is provided. By having the Receive State Machine 300 as a separate entity from Fetch Agent state machine allows the main state machine (i.e., Fetch Agent state machine 500) to operate and wait only when it needs something from the Receive State Machine 300. It should be noted that any of the herein described state machines has the ability to have their its respective states forced by writing a register. This would be equivalent to (Any State) providing an input for writing to the register.

Figure 4:
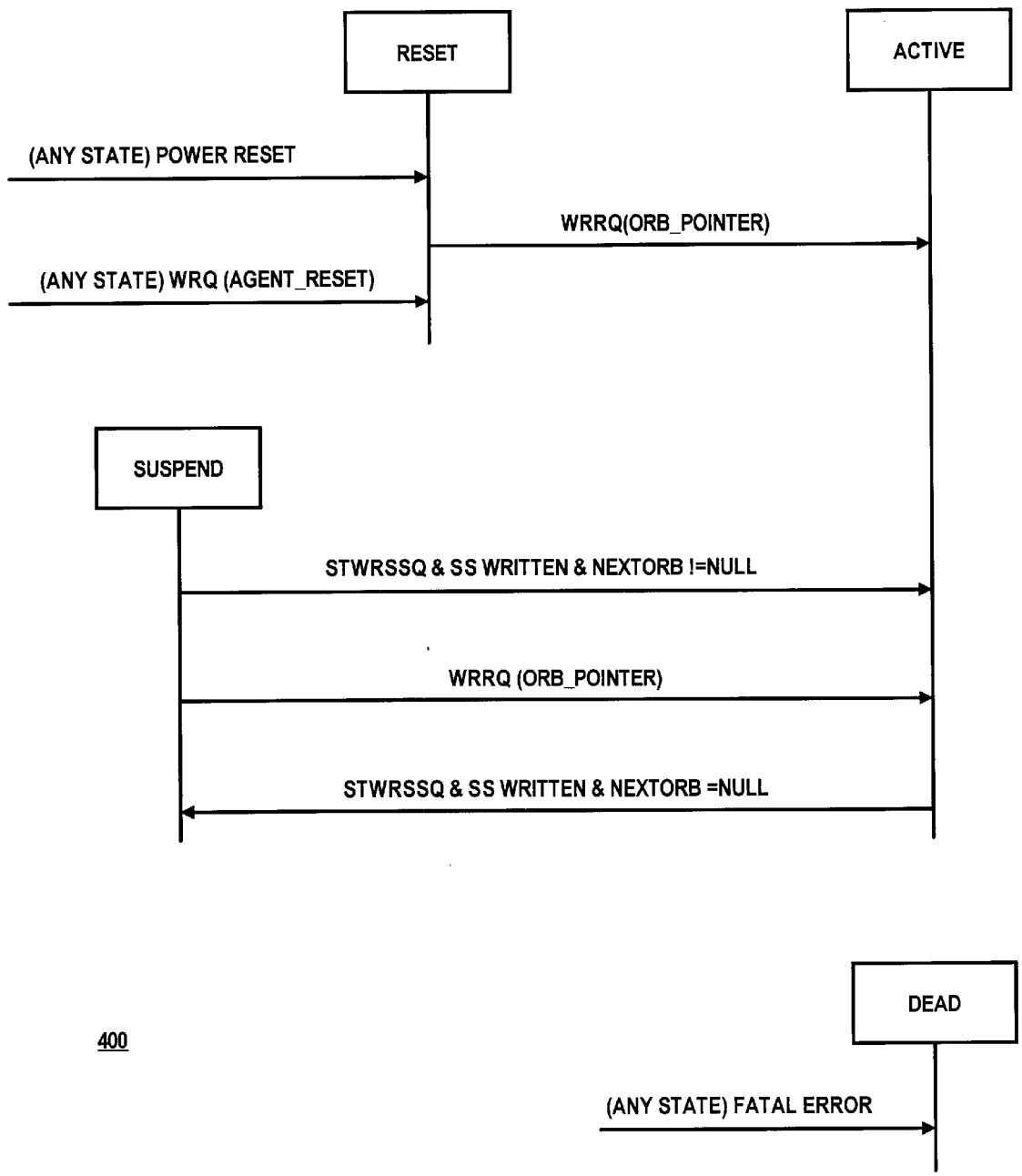
FIG. 4 is a diagram of an example state machine capable of controlling another state machine in accordance with the present invention.

Referring now to FIG. 4, a diagram of an example state machine for controlling another state machine in accordance with the present invention will be discussed. State machine 400 (named Agent_State) may be an example of state machine 112 shown in FIGS. 1A and 1B. A RESET state is entered into from any state of state machine 400 when a power reset input, e.g., WRQ(AGENT_RESET), is received by state machine 400. State machine 400 is set to an ACTIVE state from the reset state when state machine 400 receives a WRRQ(ORB_POINTER) input. State machine 400 is set to a SUSPEND state from the ACTIVE state when a STWRSSQ & SS WRITTEN & NEXTORB= NULL input is receive. State machine is set to the ACTIVE state from the SUSPEND state when either a WRRQ(ORB_ POINTER) signal or a STWRSSQ & SS WRITTEN & NEXTORB !=NULL input is received. State machine 400 enters into a DEAD state from any other state in the event a FATAL ERROR input is received.

Figure 5:
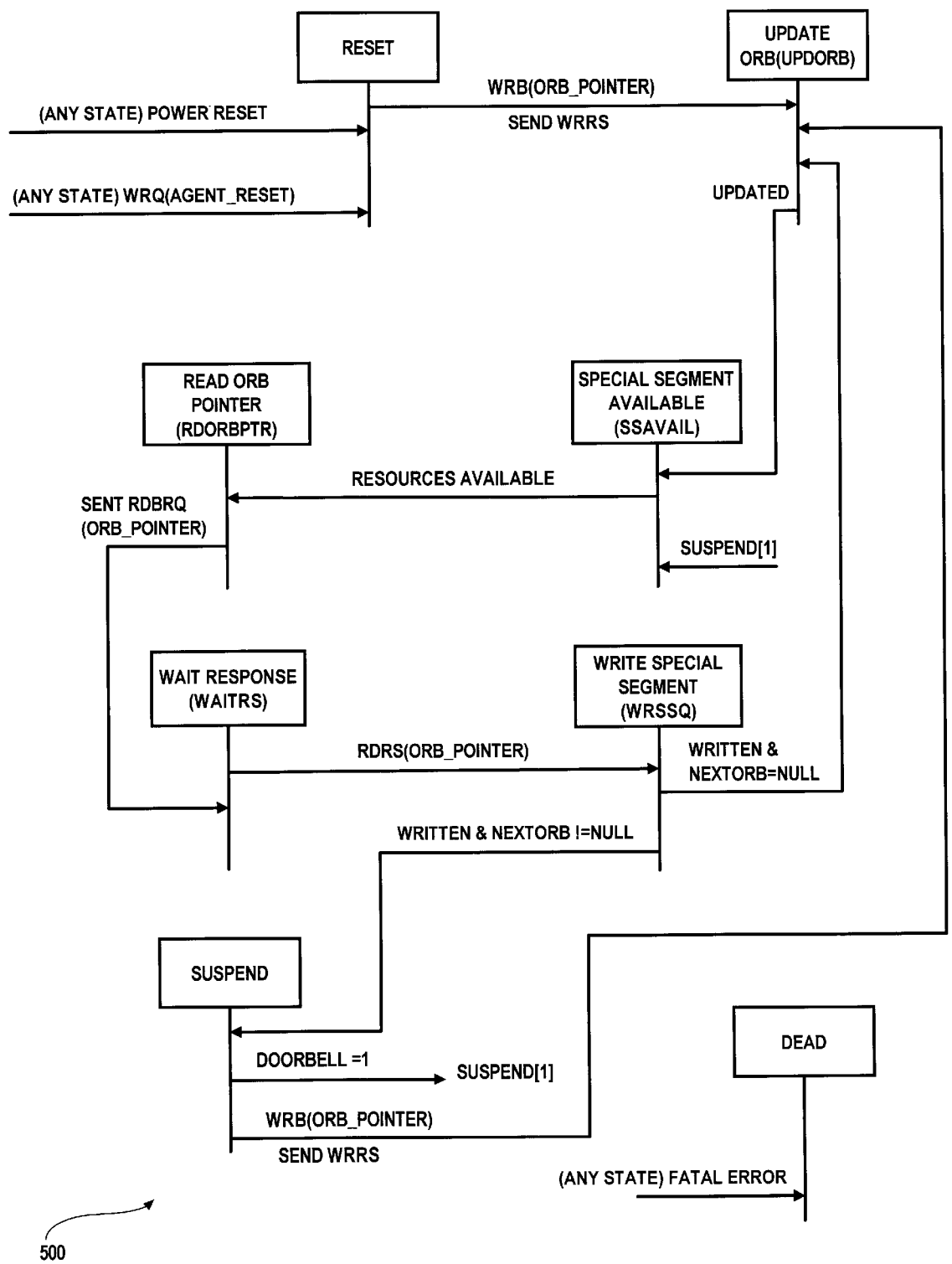
FIG. 5 is a diagram of an example state machine capable of being controlled by the state machine shown in FIG. 4 in accordance with the present invention.

Referring now to FIG. 5, a state machine capable of being controlled by the state machine shown in FIG. 4 will be discussed. State machine 500 (named Fetch Agent) may be an example of state machine 110 of FIGS. 1A and 1B. A RESET state is entered into from any state when state machine 500 receives either a POWER RESET or a WRQ (AGENT_RESET) input. From the RESET state, state machine 500 enters into an UPDATE ORB(UPDORB) state when either a WRB(ORB_POINTER) or a SEND WRRS input is received. When UPDATE ORB(UPDORB) state provides an UPDATED input, state machine 500 enters into a SPECIAL SEGMENT AVAILABLE (SSAVAIL) state, which in turn provides a RESOURCES AVAIALABLE input thereby placing state machine into a READ ORB POINTER (RDORBPTR) state. READ ORB POINTER (RDORBPTR) state provides a SENT RDBRQ (ORB_ POINTER) input, and state machine 500 is placed into a WAIT RESPONSE (WAITRS) state. When state machine receives a RDRS(ORB_POINTER) input, state machine 500 is placed into a WRITE SPECIAL SEGMENT (WRRSQ) state. When in the SPECIAL SEGMENT (WRRSQ) state, state machine 500 is placed into the UPDATE ORB(UPDORB) state when a WRITTEN & NEXTORB=NULL input is received. When a WRITTEN & NEXTORB !=NULL signal is received, state machine 500 is placed into a SUSPEND state. When a DOORBELL=1 input is received, SUPSEND state provides a SUSPEND[1] output which places state machine 500 into the WRITE SPECIAL SEGMENT (WRRSQ) state. When in the SUSPEND state either a WRB(ORB_POINTER) input or a SEND WRRS input is received, state machine 500 is placed into the UPDATE ORB(UPDORB) state. From any state, state machine enters the DEAD state when a FATAL ERROR input is received.

As can be seen from the Fetch Agent specification of state machine 500, there are repeat functions that have to be done, including Sending Read Requests (RdRq) of the Orb Pointer and writing of the ORB_POINTER. Being in the ACTIVE & SUSPEND Agent_States also have similar paths. So, instead of creating multiple states doing the same thing, the Agent_State state machine 400 tracks the state of Fetch Agent was in. Based on the state of Agent_State state machine 300, Fetch Agent state machine 500 will perform a corresponding function. For example, when state machine 500 is in the RDORBPTR state, the size of the read can either be 32 or 8 bytes depending on whether the Agent_State state machine 400 is in the ACTIVE or the SUSPEND state, respectively. When a write of the ORB_POINTER occurs and the Fetch Agent state machine 500 is in the SUSPEND or RESET states, either will go to the UPORB states to update the ORB_POINTER and will continue down the same path from there.

The control of state machine 500 based upon the state of state machine 400 eliminates the need for extra states in state machine 500 for performing the same basic function. Any performance penalty of using multiple state machines is minimized due to the sequential nature of this block, and gate savings are provided as well which further simplifies state machine 500 and overall system 100. Rather than causing system 100 to be more complex, the logic used to make the changes of state machine 500 depending on the state or state machine 400 is simpler than adding extra states to state machine 500.

One typical advantage of performing actions in software is flexibility since a programmer is capable of implementing changes by modifying the source code and then recompiling. The Fetch Agent state machine 500 as shown in FIG. 5 is realized in a hardware embodiment that is designed with a plurality of registers in order to provide the flexibility of a software implementation. Thus, with state machine 500, the following may be easily modified: the state of the Receive State Machine; the state of the main state machine; the maximum and minimum segment that is available in the Special Segment; the head of the special segment FIFO; the tail of the special segment FIFO; the ORB pointer; the Node ID for destination packets; and the capability to enable/disable any of the interrupts generated by the Fetch Agent. Having this configurability provided in state machine 500 allows a user to change options as desired, or allows a user to be able to adapt to changes in a specification to which the state machine is designed, for example in accordance with a SBP2 specification. This can be achieved with a hardware realization of the state machine as follows. First, the Fetch Agent state machine 500 was implemented in software. Next, the Agent_State register was set up to match the states specified in the AGENT_STATE CSR, which allows the hardware implemented Fetch Agent to match the states specified in a desired specification, such as in accordance with an SBP2 specification.

Figure 6:
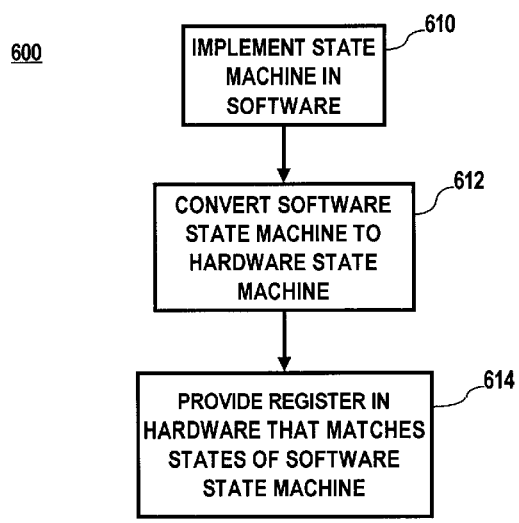
FIGS. 6 and 7 are flow diagrams of the operation of a state machine in accordance with the present invention.
Figure 7:
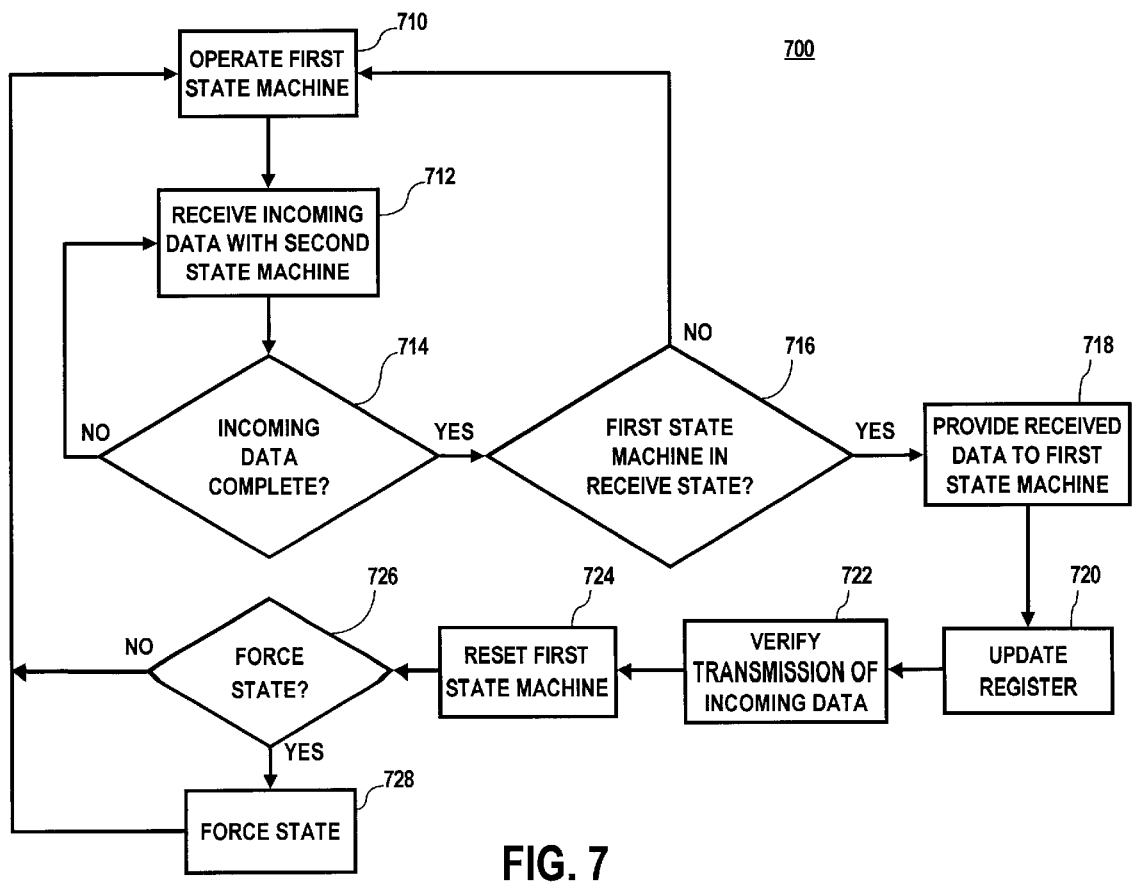

Referring now to FIGS. 6 and 7, flow diagrams of methods in accordance with the present invention will be discussed. Methods 600 and 700 may be implemented by system 100 in accordance with the present invention. Methods 600 and 700 may be implemented in software as a program of instructions capable of being executed by a computer system. Alternatively, methods 600 and 700 may be directly implemented in hardware using a combination of logic gate, flip-flops, latches, registers, etc. Although one order of the steps in each of FIGS. 6 and 7 is shown, it would be appreciated by one having skill in the art that the order of the steps need not be limited to either the steps shown or the order of the steps as shown in each of FIGS. 6 and 7 such that the number of steps and the order of the steps may be altered without providing a substantial change to the spirit or to the scope of the invention. In FIG. 6, method 600 includes a step 610 for implementing a state machine such as state machines 300, 400 or 500, in software as a program of instructions executable by a processor of a controller or computer system. The software implementation of the state machine is then converted to a hardware realization of the state machine at step 612. At step 614, at least one or more registers are provided in the hardware realized implementation of the state machine where the at least one or more registers match the states of the software implemented state machine. As a result, the hardware state machine provides a higher performance level as attained with a hardware circuit implementation over a software implementation, while providing the flexibility to modify at least one or more aspects of the state machine as with a software implemented state machine in accordance with the present invention.

In FIG. 7, a flow diagram of a method for operating a main state machine in conjunction with a receive state machine for receiving incoming data packets will be discussed. Method 700 includes step 710 for independently operating a first, main state machine, and step 712 for receiving incoming data with a second, independent state machine. A determination is made at step 714 whether the incoming data is completely received by the second state machine. In the event the incoming data is incomplete, the second state machine continues to receive the incoming data at step 712 without requiring intervention of the first state machine. Upon completion of receiving the incoming data, a determination is made at step 716 whether the first state machine is in a receive state, that is ready to receive the data from the second state machine. In the event the first state machine is in a receive state, the second state machine provides the received data to the first state machine at step 718. A register of either the first or second state machine may then be updated at step 720, and verification of the transmission of the data from the second state machine to the first state machine is verified at step 722. The first state machine is reset at step 724 after the first state machine receives the data from the second state machine so that the first state machine may continue to operate at step 710 without being required to receive further incoming data packets when the first state machine is not in a receive state. A determination may be made at step 726 whether it is necessary to force a state of either the first or the second state machine, and in the event it is necessary, the state may be forced at step 728 by writing to a register of either the first or second state machine from any state.

It is believed that the state machine of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An apparatus, comprising:

first means, said first means having first and second states; and second means, said second means capable of receiving incoming data while said first means is in a first state, said second means capable of providing the incoming data to said first means when said first means is in said second state thereby freeing said first means from receiving incoming data while said first means is in said first state.

2. An apparatus as claimed in claim 1, said second means being in a third state while receiving incoming data and being in a fourth state upon completely receiving the incoming data.

3. An apparatus as claimed in claim 1, said first and second means each comprising a state machine, respectively.

4. An apparatus as claimed in claim 1, said first and second means each comprising a state machine, respectively, each state machine being realized at least in part in hardware.

5. An apparatus as claimed in claim 1, said first and second means each comprising a state machine, respectively, each state machine being realized at least in part in hardware, each of said first and second means including a register for providing the capability of modifying the operation of each of said first and second means, respectively.

6. A method, comprising:

implementing a state machine in a software program;

converting the software program state machine to a hardware realization of the state machine;

providing a register coupled with the hardware realization of the state machine so that at least one aspect of the state machine is capable of being reconfigured without having to redesign hardware components of the hardware realization of the state machine such that the register matches the states in the software program implementation of the state machine.

7. A method as claimed in claim 6, further comprising the step of configuring the register such that the hardware realization of the state machine is in compliance at least in part with a SBP2 specification.

8. A method, comprising:

providing a first state machine;

receiving incoming data with a second state machine while the first state machine is in a first state; and in the event the first state machine is in a second state, providing the received incoming information to the second state machine.

9. A method as claimed in claim 8, further comprising the step of completely receiving the incoming data with the second state machine before executing said step of providing the received incoming information to the second state machine.

10. A method as claimed in claim 8, further comprising the step of updating a register of the first state machine upon executing said step of providing the received incoming information to the second state machine.

11. A method as claimed in claim 8, further comprising the step of resetting the first state machine upon executing said step of providing the received incoming information to the second state machine.

12. A method as claimed in claim 8, further comprising the step of verifying the execution of said step of providing the received incoming information to the second state machine.

13. A method as claimed in claim 8, further comprising the step of forcing a state of the first state machine by writing to a register of the first state machine.

14. A method as claimed in claim 8, further comprising the step of forcing a state of the second state machine by writing to a register of the second state machine.

* * * * *